(12) United States Patent
Oldenburg et al.

(10) Patent No.: US 11,292,223 B2
(45) Date of Patent: Apr. 5, 2022

(54) SANDWICH STRUCTURE HAVING AN EMBEDDED CONNECTING ELEMENT

(71) Applicant: Lufthansa Technik AG, Hamburg (DE)

(72) Inventors: Frederic Oldenburg, Hamburg (DE); Moritz Reifferscheid, Basedow (DE)

(73) Assignee: LUFTHANSA TECHNIK AG, Hamburg (DE)

( * ) Notice: Subject to any disclaimer, the term of this patent is extended or adjusted under 35 U.S.C. 154(b) by 0 days.

(21) Appl. No.: 16/635,565

(22) PCT Filed: Aug. 2, 2018

(86) PCT No.: PCT/EP2018/071015
§ 371 (c)(1),
(2) Date: Jan. 31, 2020

(87) PCT Pub. No.: WO2019/025553
PCT Pub. Date: Feb. 7, 2019

(65) Prior Publication Data
US 2020/0254713 A1    Aug. 13, 2020

(30) Foreign Application Priority Data

Aug. 3, 2017   (DE) .................... 10 2017 213 501.8

(51) Int. Cl.
*F16B 5/01* (2006.01)
*B32B 3/06* (2006.01)
(Continued)

(52) U.S. Cl.
CPC ................ *B32B 3/06* (2013.01); *B32B 3/12* (2013.01); *B32B 3/30* (2013.01); *B32B 7/12* (2013.01); *B32B 15/10* (2013.01); *B32B 15/20* (2013.01); *B32B 21/14* (2013.01); *B32B 37/12* (2013.01); *B32B 38/0004* (2013.01); *F16B 5/01* (2013.01); *B32B 2250/40* (2013.01); *B32B 2605/003* (2013.01); *B32B 2605/18* (2013.01)

(58) Field of Classification Search
CPC .................................. F16B 5/01; F16B 37/122
USPC ........................................................ 156/293
See application file for complete search history.

(56) References Cited

U.S. PATENT DOCUMENTS 4,093,491 A   6/1978   Whelpton et al.
4,341,053 A   7/1982   Dettfurth et al.
(Continued)

FOREIGN PATENT DOCUMENTS

CN   102256766 A   11/2011
CN   102753767 A   10/2012
(Continued)

*Primary Examiner* — Scott W Dodds
(74) *Attorney, Agent, or Firm* — Leydig, Voit & Mayer, Ltd.

(57) ABSTRACT

A sandwich structure includes two cover layers and a core arranged therebetween, and at least one connecting element for connection to further components. The connecting element has an insert, which is embedded into the sandwich structure at a cover layer of the two cover layers. An embedding depth of the insert is less than a thickness of the core. The connecting element is finished flush with an outer side of the cover layer via which the connecting element is embedded or protrudes from the cover layer.

6 Claims, 3 Drawing Sheets

(51) Int. Cl.
*B32B 3/12* (2006.01)
*B32B 3/30* (2006.01)
*B32B 7/12* (2006.01)
*B32B 15/10* (2006.01)
*B32B 15/20* (2006.01)
*B32B 21/14* (2006.01)
*B32B 38/00* (2006.01)
*B32B 37/12* (2006.01)

(56) References Cited

U.S. PATENT DOCUMENTS

| | | | | |
|---|---|---|---|---|
| 4,428,705 | A | * 1/1984 | Gelhard | ................ F16B 37/122 |
| | | | | 29/460 |
| 5,378,099 | A | 1/1995 | Gauron | |
| 2011/0296788 | A1 | * 12/2011 | Cove | .................... B29C 66/112 |
| | | | | 52/704 |
| 2012/0284970 | A1 | * 11/2012 | May | ....................... E04C 2/365 |
| | | | | 24/304 |
| 2015/0362005 | A1 | 12/2015 | Meyers | |
| 2017/0080674 | A1 | * 3/2017 | Patel | ......................... B32B 3/12 |

FOREIGN PATENT DOCUMENTS

| | | | |
|---|---|---|---|
| DE | 2911058 | A1 | 9/1980 |
| DE | 102014108547 | A1 | 12/2015 |
| EP | 0633132 | A1 | 1/1995 |
| EP | 0891858 | A2 | 1/1999 |
| EP | 2303567 | B1 | 12/2012 |
| GB | 1353236 | A | 5/1974 |
| JP | H06126869 | A | 5/1994 |

\* cited by examiner

US 11,292,223 B2

SANDWICH STRUCTURE HAVING AN EMBEDDED CONNECTING ELEMENT

CROSS-REFERENCE TO PRIOR APPLICATIONS

This application is a U.S. National Phase Application under 35 U.S.C. § 371 of International Application No. PCT/EP2018/071015, filed on Aug. 2, 2018, and claims benefit to German Patent Application No. DE 10 2017 213 501.8, filed on Aug. 3, 2017. The International Application was published in German on Feb. 7, 2019 as WO 2019/025553 under PCT Article 21(2).

FIELD

The invention relates to a sandwich structure having an embedded connecting element and to a method for producing same.

BACKGROUND

Particularly in the field of lightweight construction, as is used for example in the aviation sector, recourse is regularly had to sandwich structures. In corresponding structures, a comparatively soft core is arranged between two force-absorbing solid cover layers and connects the two cover layers to one another in a shear-resistant manner. Depending on the core used, these structures can be very flexuraly rigid with a low weight. Here, the core frequently has a so-called honeycomb structure familiar to a person skilled in the art.

A wide variety of materials is possible both for the cover layers and the core. In the aviation sector, and particularly for fitting out the interior of cabins of commercial aircraft, use is frequently made of sandwich structures having two glass-fiber cover layers, impregnated with phenol resin, and a core composed of an aramid honeycomb structure impregnated with phenol resin. In order to give an appealing visual impression, corresponding sandwich structures are provided, at least on the surfaces which are visible in the installed state, with a veneer. If it is intended for example to impart the impression of high-grade solid wood furniture, wood veneer is first of all adhesively bonded to the sandwich structure and then provided with a high-gloss varnish.

Sandwich structures are generally present as semifinished products in the form of sandwich boards. To connect corresponding sandwich boards to other components, internally threaded sockets—so-called inserts—are introduced into the sandwich board at the connection points provided for the components. For this purpose, a blind hole is milled into the sandwich board starting from one of the two cover layers, with the insert being fastened in the hole by means of adhesive in such a way that the internal thread can serve as an attachment point.

The other cover layer is continuous in the region of a blind hole provided for an insert, that is to say in particular, not breached by an opening. The same equally applies to a veneer mounted thereon.

However, the other layer can regularly feature drawn-in surface regions, so-called insert pulls. The other cover layer is drawn in at these insert pulls by a few micrometers in the direction of the core of the sandwich board. Even though the depressions as such are not visible to the naked eye, they are clearly evident in the form of disturbed light reflections when there are polished surface veneers coated with high-gloss varnish mounted on a sandwich structure. The finishing of the areas affected by insert pull, which regularly requires revarnishing, is complex and cost-intensive.

In order to prevent the occurrence of insert pulls, the core of the sandwich structure can be replaced, in the regions in which inserts are intended to be provided, with a rigid filling material during the very production of the sandwich structure, with an insert then being able to be inserted in the filling material in the manner described. Although an insert pull no longer occurs in corresponding sandwich structures, there is, however, an increase in weight by comparison with sandwich structures without corresponding filling material. The production of corresponding sandwich structures is also complex and therefore not suitable for individual production runs or very small series.

SUMMARY

A sandwich structure includes two cover layers and a core arranged therebetween, and at least one connecting element for connection to further components. The connecting element has an insert, which is embedded into the sandwich structure at a cover layer of the two cover layers. An embedding depth of the insert is less than a thickness of the core. The connecting element is finished flush with an outer side of the cover layer via which the connecting element is embedded or protrudes from the cover layer

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
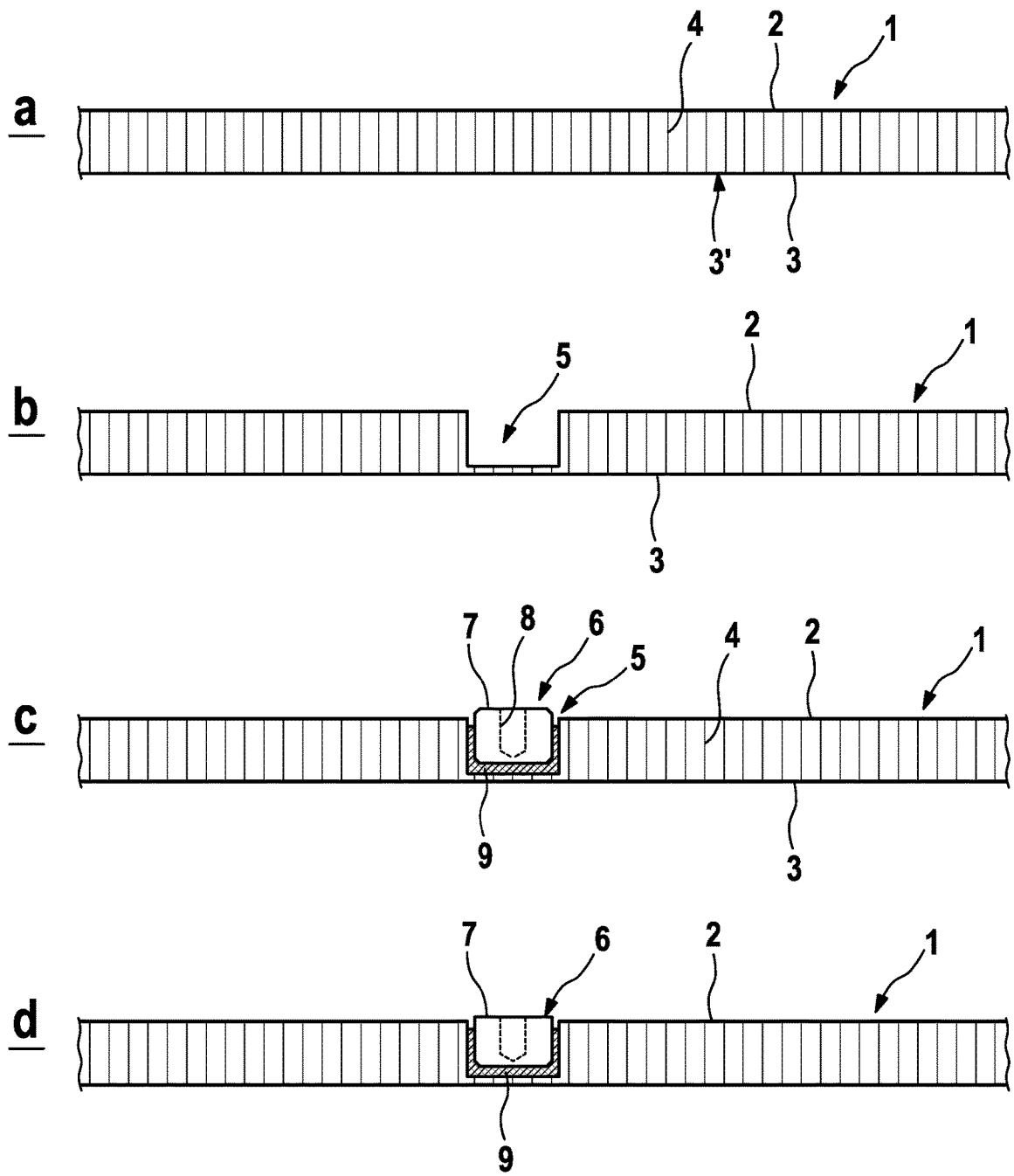
FIGS. 1a-1d show a first exemplary embodiment of a method according to the invention for producing a first sandwich structure according to the invention.

Embodiments of the present invention provide a sandwich structure having a connecting element embedded therein and a method for producing same in which the disadvantages of the prior art no longer arise or arise only to a reduced extent.

Accordingly, an embodiment of the invention relates to a sandwich structure having two cover layers and a core arranged therebetween, which sandwich structure has at least one connecting element for connection to further components. The connecting element includes an insert, which is embedded into the sandwich structure at a cover layer and the embedding depth of which is less than the thickness of the core of the sandwich structure. The insert or a compensating element arranged on the insert is finished flush with the outer side of the cover layer via which the insert is embedded or protrudes therefrom.

An embodiment of the invention further relates to a method for inserting a connecting element into a sandwich structure having two cover layers and a core arranged therebetween, where the connecting element includes an insert. The method includes the following steps:
a) producing a blind hole starting from a cover layer of the sandwich structure;
b) introducing the connecting element into the blind hole and fastening the connecting element therein; and
c) finishing the connecting element such that it is flush with the cover layer or protrudes by a predetermined height from the cover layer.

The "thickness of the core of the sandwich structure" corresponds to the distance between the two cover layers. "Embedding depth" refers to that depth by which the insert is embedded into the sandwich structure.

The invention is based on the finding that insert pulls occur particularly when an insert is arranged so as to be set back with respect to the cover layer via which the insert is embedded into the sandwich structure. If a screw inserted into the internal thread of the insert is tightened while the sandwich structure lies on another component, there can occur deformation of the sandwich structure that can ultimately lead to an insert pull of the other cover layer.

In order to avoid this, there is provision according to an embodiment of the invention that the connecting element including an insert is finished flush with the outer side of the cover layer at which it is embedded or protrudes from the cover layer. This prevents a situation in which the tightening of a screw inserted into the insert can give rise to a relative movement between the connecting element and the sandwich structure and hence to an insert pull.

What is to be understood by a finished connecting element within the sense of this invention is a connecting element which is finished in the state in which it is inserted into the cover layer until it is flush with the cover layer. This can take place for example by applying or removing material. A connecting element which has been finished within the sense of this invention can be recognized by the fact that it is adapted to the plane of the cover layer in an exact manner. Furthermore, this can be recognized by the structural changes in the connecting element that arise during the application or removal of material.

The connecting element is preferably finished by flush blending with the cover layer.

The connecting element is first of all arranged so as to protrude from the cover layer. The connecting element can then, as required, be blended flush with precisely this cover layer. In other words, the connecting element protruding first of all above the cover layer is ground until it is flush with the cover layer. The cover layer itself is not damaged or ground during this process. Whether a connecting element has been arranged flush with the cover layer or has been blended flush can also be readily discerned subsequently, for example by way of grinding traces and/or the configuration of the edges of the connecting element at the blended surface.

Instead of flush blending, it is also possible for the connecting element to protrude from, or remain protruding from, that cover layer via which it is embedded into the sandwich structure. In this case, too, an insert pull is effectively avoided at the other cover layer.

If the connecting element is not blended flush, it preferably protrudes by less than 6 mm, more preferably by less than 3 mm, from the cover layer via which it has been embedded. A protruding connecting element can also be ground in order for example to achieve a desired height of the protrusion and/or a parallelity of the ground face of the connecting element with the cover layer.

The connecting element can exclusively comprise an insert. However, it is also possible for the connecting element to include a compensating element which is arranged on the insert and is free of overlap with the cover layer. "Free of overlap" means in this connection that the compensating element does not overlap the cover layer in a projection perpendicularly through the cover layer. In other words, the compensating element is situated completely within the circumferential line of the insert in this projection. If a compensating element is provided, it can be finished flush, preferably blended, with the cover layer, or protrudes beyond the cover layer. In the last-mentioned case, it is also possible for the insert itself to already protrude beyond the cover layer, but a greater height of the protrusion is achieved by an additional compensating element. The compensating element can be arranged on the insert after the latter has been embedded into the sandwich structure. In this case, the insert can be first of all introduced into the sandwich structure according to the prior art and only then becomes a connecting element according to the invention by the application of the compensating element.

The compensating element can be composed of knifing filler which cures after application to the insert or can be a prefabricated component which is in contact with the insert or is preferably connected to the insert in an integrally bonded manner. The prefabricated component can for example be configured to be annular and comparable to a washer. If the compensating element is a prefabricated component, it is preferable if it is composed of material which is corrosion-resistant in relation to the material of the insert.

In a preferred embodiment, it is possible for a metal sheet which overlaps both the connecting element and the cover layer of the sandwich structure to be provided. The space between the insert and the overlapping metal sheet is filled with the curing knifing filler. The overlapping metal sheet allows a simple way of providing a boundary, which is flush with the cover layer, for the curable knifing filler which serves as compensating element. This embodiment thus allows simple and precise cover-layer-flush finishing of the compensating element, and therefore of the connecting element.

A corresponding metal sheet also makes it possible for the introduction of force in the region of the connecting element to be distributed over the sandwich structure over a large area, with the result that loading peaks potentially leading to damage to the sandwich structure can be avoided.

The core of the sandwich structure is preferably a honeycomb core, composed of aluminum or fiber-reinforced plastic. An appropriate core allows particularly lightweight sandwich structures to be achieved. It is further preferable if the insert is made of metal. A high load-bearing strength of the internal thread is regularly achieved in the case of a metal insert.

The sandwich structure according to the invention is particularly advantageous in the cases in which a glossy surface layer, such as for example a wood veneer coated with high-gloss varnish, a paint, a film, leather or some other textile, is mounted on the cover layer via which the connecting element is not embedded.

For an explanation of the method according to the invention, reference is made to the explanations given above.

The invention will now be described by way of example on the basis of advantageous embodiments with reference to the appended drawings.

In FIGS. 1a-d, a method for producing a first sandwich structure 1 according to an embodiment of the invention is shown.

FIG. 1a shows the starting state of the sandwich structure 1. The sandwich structure 1 includes two cover layers 2, 3 which are fixedly connected to one another via a core 4 in the form of a honeycomb. Both the covers layers 2, 3 and the core 4 are produced from fiber-reinforced plastic. On the cover layer 3 illustrated at the bottom of FIG. 1a there is arranged a wood veneer 3' which is coated with high-gloss varnish.

In a first step, a blind hole 5 is produced by milling starting from the one cover layer 2 of the sandwich structure 1, with the result that the other cover layer 3 remains completely intact (FIG. 1b).

A connecting element 6 consisting of an insert 7 having an internal thread 8 is then arranged in this blind hole 5 and fastened therein using adhesive 9. Here, by contrast with the prior art, the insert 7 is, however, arranged so as to protrude beyond the cover layer 2 of the sandwich structure 1. Here, the embedding depth of the insert 7 is less than the thickness of the core 4, resulting in a distance between the insert 7 and the other cover layer 3 (FIG. 1c).

After curing the adhesive 9, the connecting element 6 is blended in such a way that it protrudes only by a predetermined height above the cover layer 2 (FIG. 1d). This blending can also generally still be readily observed subsequent to the actual method, for example by way of grinding traces or the absence of the originally provided bevel at the end of the upper side of the insert 7 (cf. FIG. 2c). It is of course also possible for the predetermined height to be equal to zero, with the connecting element 6 thus being ground flush with the cover layer 2.

Since according to the invention the connecting element 6 is securely flush with or protrudes beyond the cover layer 2, an insert pull on the other cover layer 3 in the region of the connecting element 6 can be effectively avoided.

Figure 2:
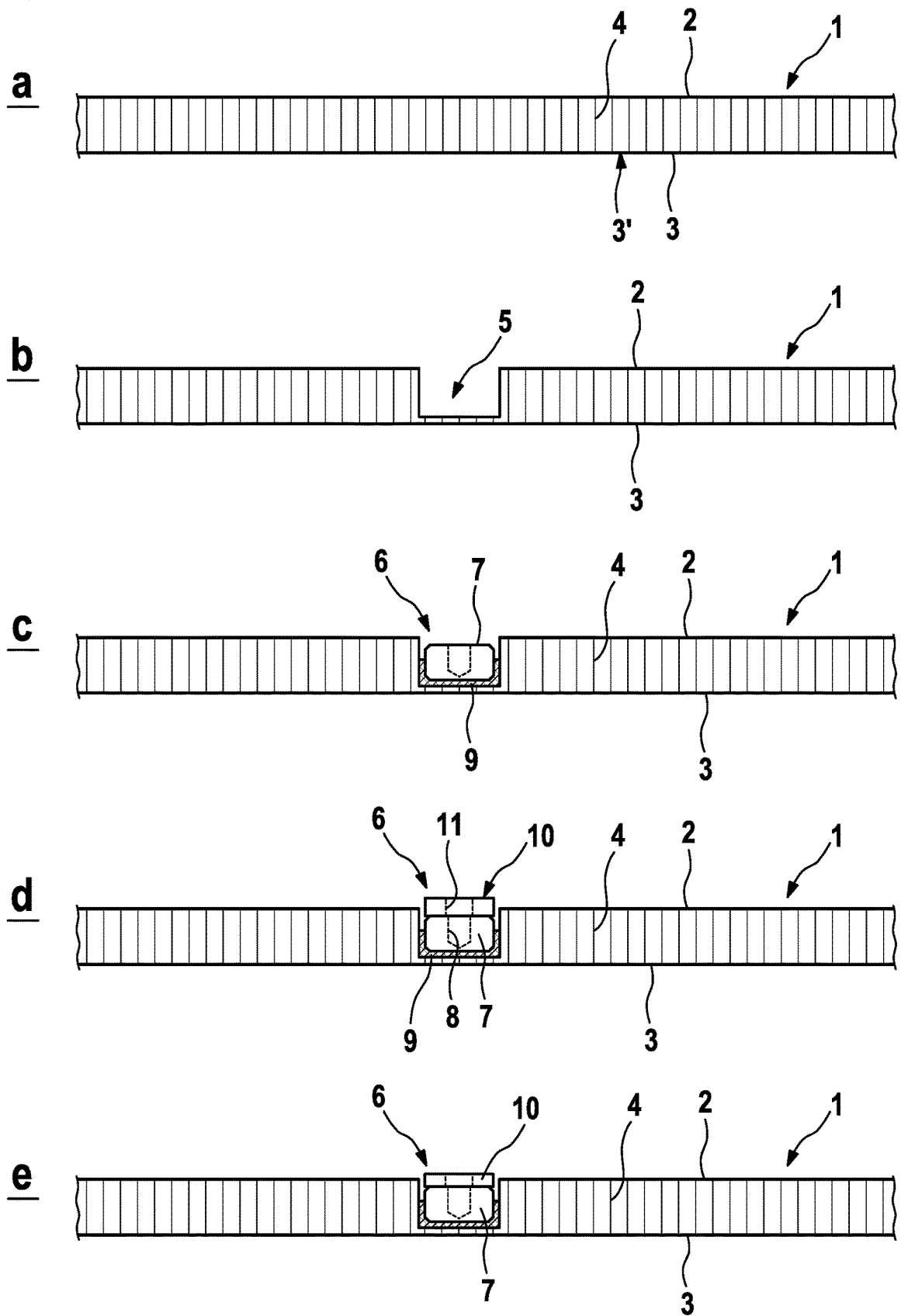
FIGS. 2a-2e show a second exemplary embodiment of a method according to the invention for producing a second sandwich structure according to the invention.

FIG. 2 illustrates a second exemplary embodiment of a method according to the invention for producing a sandwich structure 1 according to the invention.

FIG. 2a here shows the starting state of the sandwich structure 1, this state being identical to FIG. 1a. The sandwich structure again includes two cover layers 2, 3 composed of fiber-reinforced plastic which are fixedly connected to one another via a core 4 in the form of a honeycomb core, likewise composed of fiber-reinforced plastic. A wood veneer 3' coated with high-gloss varnish is arranged on the one cover layer 3.

In a first step, a blind hole 5 is again produced by milling starting from the cover layer 2 of the sandwich structure 1 that is not provided with the wood veneer 3', with the other cover layer 3 and the wood veneer 3' arranged thereon remaining completely intact (FIG. 2b).

Then, in a known manner, an insert 7 as part of the connecting element 6 is introduced into this blind hole 5 and fastened using adhesive 9. Here, the insert 7 is sunk in the sandwich structure 1, that is to say the outwardly accessible side of the insert 7 is arranged set back behind the cover layer 2. However, the embedding depth of the insert 7 is, here too, less than the thickness of the core 4 (FIG. 2c).

Then, to complete the connecting element 6, a separate component as compensating element 10 having a shape comparable to a washer is preferably connected to the insert 7 in an integrally bonded manner, in this case by adhesive bonding, onto the insert 7. The compensating element 10 has a through-opening 11 such that the internal thread 8 of the insert 7 remains accessible. At the same time, the compensating element 10 is free of overlap with the cover layer 2 (FIG. 2d).

Finally, the connecting element 6, that is to say in particular the separate compensating element, is blended in such a way that it protrudes only by a predetermined height above the cover layer 2 (FIG. 2e). It is of course also possible for the predetermined height to be equal to zero, with the connecting element 6 thus being ground flush with the cover layer 2. Here, too, an insert pull on the other cover layer 2 in the region of the connecting element 6 can be effectively avoided.

Figure 3:
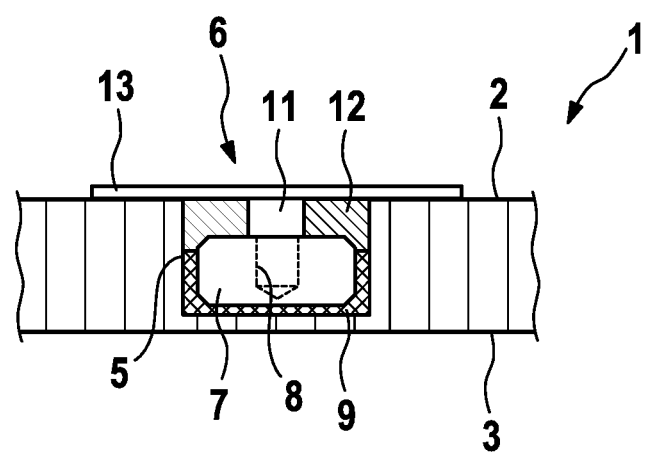
FIG. 3 shows a third exemplary embodiment of a method according to the invention for producing a third sandwich structure according to the invention.

FIG. 3 illustrates a third exemplary embodiment of a method according to the invention for producing a sandwich structure 1 according to the invention.

As in the case of the exemplary embodiments explained above, at first the insert 7 is fastened using adhesive 9 in the blind hole 5 of the sandwich structure 1. Here, however, the insert 7 does not reach up as far as the cover layer 2, with the insert 7 thus being arranged set back behind the cover layer 2.

The finishing according to the invention of the connecting element 6, such that the latter is flush with the cover layer 2, occurs in this case by the application of a curing knifing filler 12; this functions as a compensating element 10. In order to avoid laborious smoothing of the knifing filler, which would also be conceivable, a metal sheet 13 which overlaps the cover layer 2 is provided. The metal sheet 13, together with the insert 7, forms a filling space which is filled with the knifing filler 12. The knifing filler is distributed in the thus-formed filling space in such a way that it forms a compensating element 10 flush with the cover surface 2. In this procedure, the metal sheet 13 has a filling opening for filling the filling space with knifing filler.

Alternatively, it is also possible at first for the blind hole 5 to be filled with knifing filler 12 after inserting the insert 7. Here, somewhat more knifing filler 12 is preferably applied than the filling space can accommodate. The metal sheet 13 is then arranged to overlap the blind hole 5 and the cover layer 2, with the result that the excess knifing filler 12 is pressed out of the filling space. This procedure can likewise ensure that the connecting element 6 is finished flush with the cover layer 2.

To ensure that the internal thread 8 remains accessible, a through-opening 11 is preferably provided.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for inserting a connecting element into a sandwich structure comprising two cover layers and a core arranged therebetween, wherein the connecting element comprises an insert, the method comprising the following steps:
   a) producing a blind hole starting from a cover layer of the two cover layers of the sandwich structure;
   b) predetermining a first height for the connecting element to protrude from the cover layer
   c) introducing the connecting element into the blind hole and fastening the connecting element therein such that, upon completion of the fastening, the connecting element protrudes by the first height from the cover layer; and
   d) finishing the connecting element by grinding until it is flush with the cover layer or protrudes by a predetermined height from the cover layer, the predetermined height being smaller than the first height.

2. The method as claimed in claim 1, wherein the connecting element is ground to a height of less than 6 mm above the cover layer.

3. The method as claimed in claim 1, wherein the introduction of the connecting element into the blind hole and fastening of the connecting element therein comprises the following substeps:
   introducing the insert into the blind hole and fastening the insert therein; and
   arranging a compensating element on the insert such that it is free of overlap with the cover layer and protrudes therefrom.

4. The method as claimed in claim 3, wherein the arranging the compensating element comprises one of:
   applying a knifing filler to the insert and curing the knifing filler to form the compensating element, or
   fastening a prefabricated component to the insert in an integrally bonded manner, the prefabricated component being the compensating element.

5. The method as claimed in claim 1, wherein a glossy surface layer is mounted on the cover layer from which the blind hole to be produced does not start.

6. A method for inserting a connecting element into a sandwich structure comprising two cover layers and a core arranged therebetween, wherein the connecting element comprises an insert, the method comprising the following steps:
   a) producing a blind hole starting from a cover layer of the two cover layers of the sandwich structure;
   b) introducing the connecting element into the blind hole and fastening the connecting element therein such that, upon completion of the fastening, the connecting element protrudes by a first height from the cover layer; and
   c) finishing the connecting element by grinding until it protrudes by a predetermined height from the cover layer, the predetermined height being smaller than the first height.

* * * * *